Oct. 8, 1935.                H. W. KROTZER                2,016,377
                            REFRIGERATED VEHICLE
                            Filed July 11, 1932
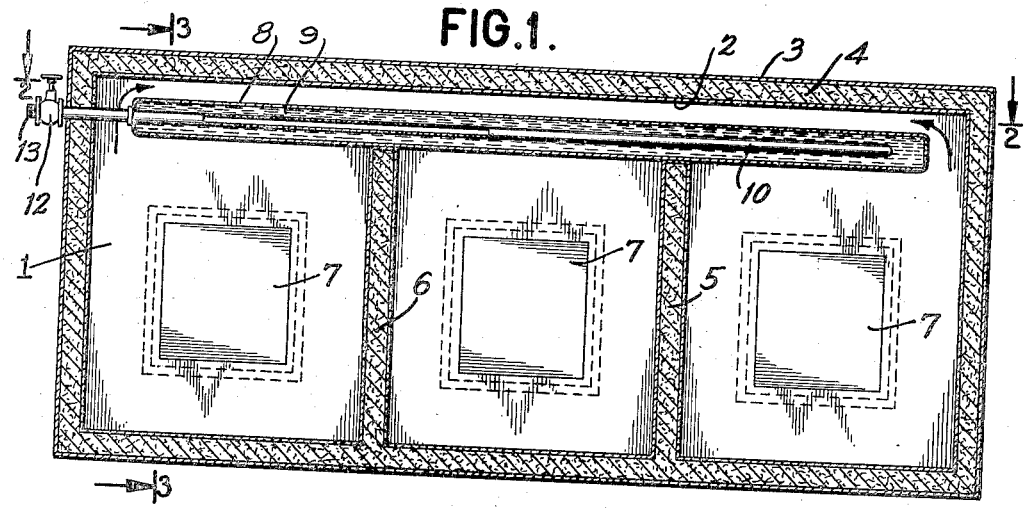
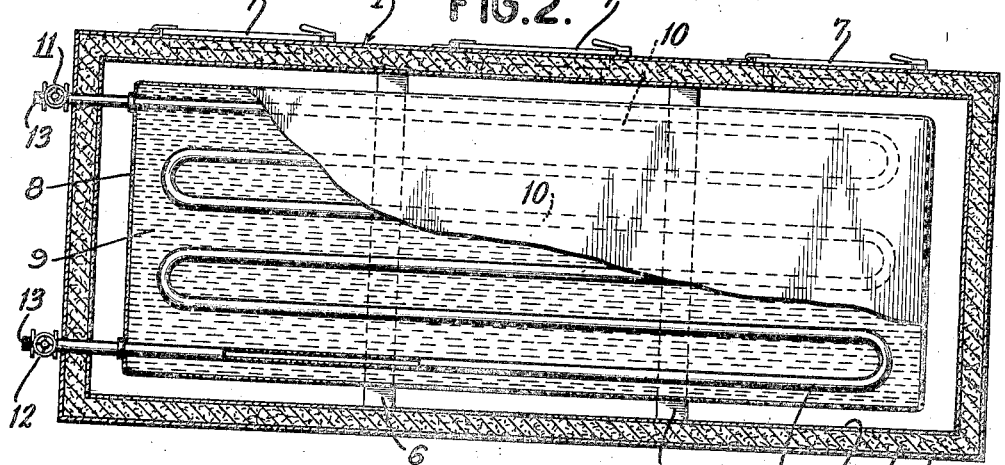
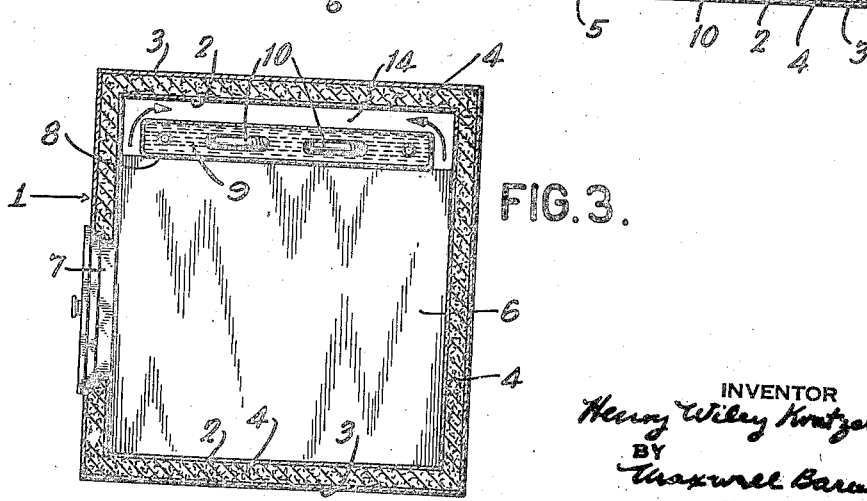
INVENTOR
Henry Wiley Krotzer
BY
Maxwell Barus
ATTORNEY Patented Oct. 8, 1935

2,016,377

UNITED STATES PATENT OFFICE 2,016,377

REFRIGERATED VEHICLE

Henry Wiley Krotzer, Pleasantville, N. Y., assignor to The Borden Company, New York, N. Y., a corporation of New Jersey Application July 11, 1932, Serial No. 621,818

5 Claims. (Cl. 62—95)

This invention relates to refrigerated vehicles, used for the transportation of chilled or frozen foods or other materials, and more particularly to vehicles provided with a refrigeration storage medium, but not equipped with refrigerating mechanism. In the practice of the present invention in its preferred form, means are provided whereby the vehicle may be refrigerated during a part of the day when the vehicle is not in use, the vehicle then being uncoupled from the refrigerating mechanism and placed in service. The refrigeration stored in the storage medium with which the vehicle is provided is sufficient to maintain the desired low temperatures within the vehicle until the latter is again taken out of service and coupled to the refrigerating mechanism. Accordingly, this invention has for its objects the provision of suitable means for storing "cold" within a vehicle, means for replenishing the stored "cold" or refrigeration, and means for equalizing, throughout the vehicle, the low temperature produced by the dissipation of such stored refrigeration. Other objects will appear from the description which follows.

In the accompanying drawing Fig. 1 is a vertical longitudinal section through a vehicle body equipped according to my invention; Fig. 2 is a horizontal section on line 2—2 of Fig. 1, with a portion of the cover of the refrigeration storage tank broken away; Fig. 3 is a vertical transverse section on line 3—3 of Fig. 1.

The body 1, which may be that of a motor truck, railway car, or other vehicle, is constructed with an inner sheathing 2 and an outer sheathing 3, which may be of metal or other suitable material, and an intervening layer 4, of cork or other insulating material. In the present embodiment, the body 1 is divided into compartments by the vertical transverse partitions 5 and 6, which may be constructed in the same manner as the outer shell of the body. Each compartment is provided with a door 7.

The partitions 5 and 6 do not extend to the ceiling of the body 1, but are terminated at a suitable distance therefrom, preferably 8 or 10 inches. The refrigeration storage tank 8, consisting of a relatively flat, oblong shell of sheet metal or other suitable material, is supported on the tops of the partitions 5 and 6. As best illustrated in Fig. 2, the tank 8 contains, in addition to the refrigeration storage medium 9, a series of convolutions 10 of pipe, terminating in the valves 11 and 12. Each valve is provided with a threaded coupling member 13.

In carrying out my invention, the vehicle is moved to a position adjacent a refrigerating mechanism (not shown) which may consist of any suitable device for circulating refrigerant through the convolution or coils 10. The refrigerating mechanism may be connected to the coupling members 13 by flexible connectors or other suitable means, after which valves 11 and 12 are opened and the refrigerating mechanism started. By this means heat is withdrawn from the medium 9 in the tank 8, and "refrigeration" is stored. When the desired amount of refrigeration has been stored in the medium 9, the valves 11 and 12 may be closed, and the vehicle uncoupled from the refrigerating mechanism.

The medium 9 is preferably a solid or semi-solid material, such as are well known in the art and obtainable commercially, for example, a jelly-like substance, so that the possibility of leakage may be eliminated. Also the medium 9 should have high values of specific heat and latent heat, in order that the greatest practicable amount of refrigeration may be stored in a minimum of space. If an increased rate of heat interchange between the coils 10 and the medium 9 is desired, the outer surfaces of said coils may be corrugated or finned. Similarly, the surface of the tank 8 may be finned or corrugated, if desired, in order to effect the desired rate of heat interchange between the tank surface and the atmosphere within the body 1.

An air space 14, several inches in depth, is provided between the top surface of tank 8 and the ceiling of the body 1. Similar air spaces are provided between the sides and ends of the tank 8 and the adjacent walls of the body 1. In this manner a free circulation of air within the body 1 is permitted. Warm air from all compartments rises to the ceiling and, due to the intercommunication between compartments is evenly distributed above the tank 8. Similarly, the chilled air falling from the surface of tank 8 will be properly distributed between the several compartments. Thus it will be appreciated that, when the door of any compartment is opened, only the cold air in that compartment, above the door-sill, and that in the stratum above the tops of the partitions 5 and 6 will be lost, even though the door be left open for a considerable period. The temperature of the remaining compartments will continue substantially unaffected. The warm air replacing the cold air so lost will surround the entire surface of the tank 8, and will be chilled, after which it will descend into the compartment which has been opened to the atmosphere, to be replaced by the warm air therein. Thus it is apparent that the reestablishment of the desired temperature in such compartment will occur much more quickly than if only that portion of the tank 8 directly above the particular compartment were exposed to the warm air admitted. In this manner the temperatures of the several compartments are maintained substantially equal regardless of the varying extents to which the outer atmosphere is admitted to the several compartments by the opening of the doors 7 to remove the food supplies or other material stored therein.

It has been found that vehicles equipped according to my invention are capable of maintaining very low interior temperatures for considerable periods of time in transit, that is to say, while disconnected from the refrigerating mechanism. The expense of providing refrigerating machinery for each vehicle is eliminated, and the size and weight of the vehicles are considerably lessened in proportion to the space available for the pay load.

The terms and expressions employed in the foregoing specification are merely descriptive, and it is not my intention to limit the scope of my invention to the particular embodiment described and illustrated, but it is recognized that many modifications of the same may be made and equivalents employed without departing from the scope of the appended claims.

What I claim is:

1. A cold storage enclosure comprising a box, substantially air-impervious partitions extending across said box throughout a part of its height to form a plurality of separate compartments communicating at their upper ends, each said compartment having a separate door, and a refrigerating member supported above the upper ends of said partitions.

2. A cold storage enclosure comprising a box, substantially air-impervious partitions extending across said box throughout a part of its height to form a plurality of separate compartments communicating at their upper ends, each said compartment having a separate door, and a refrigerating member supported above the upper ends of said partitions, said refrigerating member being spaced from the top and sides of said box.

3. In a refrigerated vehicle, a closed body, substantially air-impervious partitions extending across the interior of said body throughout a part of its height to form a plurality of compartments communicating at their upper ends, each said compartment having a separate door, a refrigerating member supported adjacent the roof of said body, and means whereby refrigeration from an outside source may be stored within said member.

4. A cold storage enclosure comprising a box, substantially air-impervious partitions dividing said box into a plurality of compartments, each of said compartments having a separate door, a refrigerating member, and means whereby warm air admitted to any of said compartments is permitted to circulate over the entire surface of said refrigerating member.

5. A cold storage enclosure comprising a box, substantially air-impervious partitions dividing said box into a plurality of compartments, each of said compartments having a separate door, an enclosed air space communicating with the upper end of each of said compartments, and a refrigerating member supported in said enclosed air space.

HENRY WILEY KROTZER.